United States Patent
Kuroiwa

(10) Patent No.: US 7,076,063 B2
(45) Date of Patent: Jul. 11, 2006

(54) MASTER DIGITAL DATA CREATION DEVICE AND DIGITAL DATA REPRODUCTION DEVICE

(75) Inventor: Toshio Kuroiwa, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 652 days.

(21) Appl. No.: 09/871,905

(22) Filed: Jun. 4, 2001

(65) Prior Publication Data
US 2001/0049665 A1   Dec. 6, 2001

(30) Foreign Application Priority Data
Jun. 6, 2000   (JP)   ............ P2000-168613

(51) Int. Cl.
*G06F 17/60*   (2006.01)
(52) U.S. Cl. ............ 380/201; 726/31; 705/57; 705/58; 380/202; 380/203
(58) Field of Classification Search ........ 380/201–203; 705/50–59
See application file for complete search history.

(56) References Cited

U.S. PATENT DOCUMENTS

| | | | | |
|---|---|---|---|---|
| 5,689,559 A | * | 11/1997 | Park ............ | 380/203 |
| 5,826,011 A | * | 10/1998 | Chou et al. ............ | 713/200 |
| 5,963,909 A | * | 10/1999 | Warren et al. ............ | 705/1 |
| 6,034,832 A | * | 3/2000 | Ichimura et al. ............ | 360/60 |
| 6,073,123 A | * | 6/2000 | Staley ............ | 705/58 |
| 6,343,281 B1 | * | 1/2002 | Kato ............ | 705/57 |
| 6,748,485 B1 | * | 6/2004 | Yokota et al. ............ | 711/112 |
| 6,772,133 B1 | * | 8/2004 | Kambayashi et al. ............ | 705/57 |

OTHER PUBLICATIONS

Robert Garran Offices, 'Copyright & Contract', Copyright Law Branch, AG's Dept., Commonwealth of Australia, 2005, Ch.4, http://www.ag.gov.au/agd/WWW/rwpattach.nsf/viewasattachmentPersonal/(CFD7369FCAE9B8F32F341DBE097801FF)~4Chapter4.pdf.*

* cited by examiner

*Primary Examiner*—Ayaz Sheikh
*Assistant Examiner*—Ronald Baum
(74) *Attorney, Agent, or Firm*—Nath & Associates PLLC; Gregory B. Kang; Derek Richmond

(57) ABSTRACT

Data C generated by scrambling user-desired digital data P and a control word $CW_p$ corresponding to the number of reproductions p are recorded on recording media. When creating a master, a user has already been charged for the number of reproductions p. A decryption block decrypts the control word $CW_p$, which is read from the recording media, to $CW_0$. A de-scrambler uses the decryption control word $CW_0$ to decrypt the digital data P for output to a reproduction unit. After confirming the end of reproduction, the decryption block writes a control word $CW_{(p-1)}$ back to the recording media. The recording media may be reproduced p times with no need for communication between a reproduction device and an accounting manager.

3 Claims, 4 Drawing Sheets

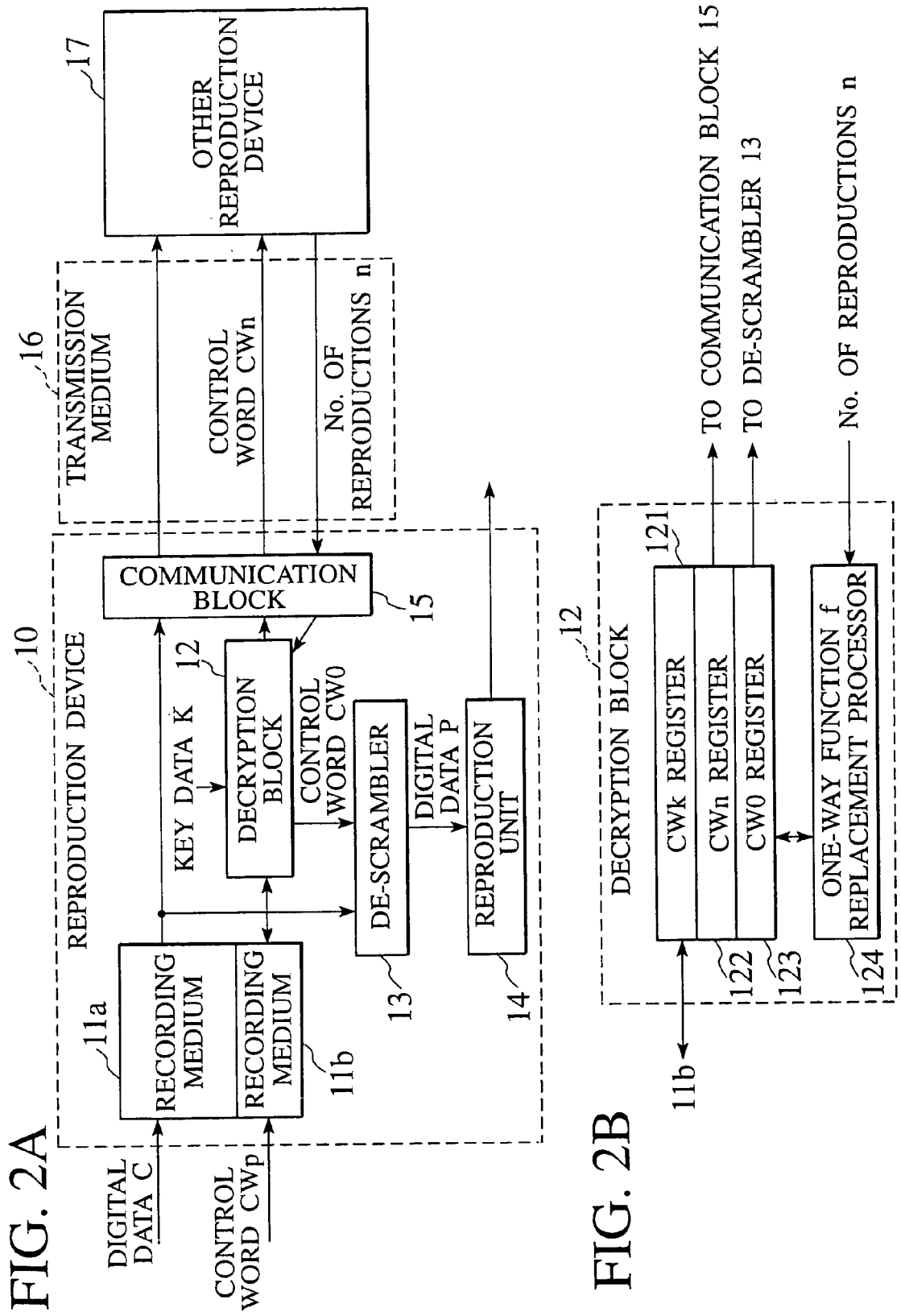

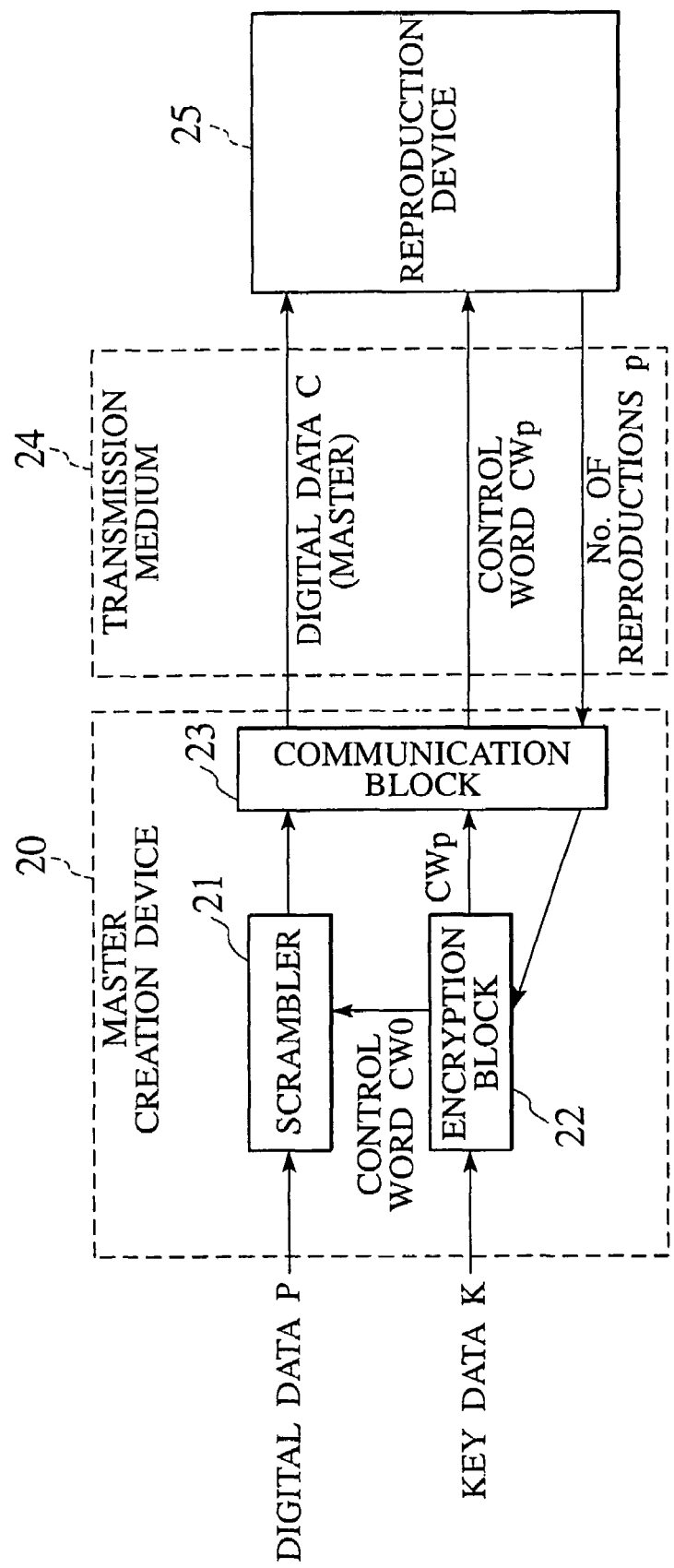

MASTER DIGITAL DATA CREATION DEVICE AND DIGITAL DATA REPRODUCTION DEVICE

BACKGROUND OF THE INVENTION

1. Field of the Invention

The present invention relates to a master digital data creation device and a digital data reproduction device, and more particularly to a master digital data creation device and a digital data reproduction device that prevent the illegal reproduction or copy of distributed digital data such as audio data and video data.

2. Description of the Related Art

Recently, more and more recording and reproduction devices and their media have become available for processing digital data. These devices and media give audio and video users many benefits such as high-speed, non-degraded recording and reliable reproduction. On the other hand, a problem has arisen that many non-degraded copies are produced quickly and sold with no permission from copyright holders. The prevention of illegal copy has become critical.

To prevent illegal copy, the SCMS (Serial Copy Management System) is used for conventional digital recording and reproduction devices such as a digital audio tape recorder (DAT) and a minidisk (MD). In the SCMS, copy permission status information is recorded in a particular area on a medium. That is, when the copy permission status information recorded on a copy source medium is "00", the same copy permission status information "00" is recorded also on a copy destination medium to permit the user to create another copy from the copy destination medium (so called copy free).

When the copy permission status information recorded on a copy source medium is "10", the copy permission status information is changed to "11" on a copy destination medium to inhibit the user from creating another copy from the copy destination medium (that is, copy is permitted only once). This system is established on the assumption that, upon detection of the copy permission status information of "11" on a medium, an SCMS-conforming device stops the copy operation.

Other conventional copy prevention methods include digital data encryption. This is accomplished by scrambling copy-protecting digital data with the use of a predetermined control word and, at the same time, by encrypting the control word with particular key data.

FIG. 1 shows the overview of an exemplary conventional copy protection method. In a mastering device 1 shown in the figure, a scrambler 2 scrambles digital data P, such as audio service (contents) data, using a control word P and outputs scrambled digital data C to a recording medium 4. At the same time, an encryption unit 3 encrypts the control word P using key data K and outputs a control word C to the recording medium 4.

In a reproduction device 5, a decryption unit 6 receives the control word C reproduced from the recording medium 4 and decrypts it to the control word P using the key data K. At the same time, in the reproduction device 5, a descrambler 7 receives the digital data C reproduced from the recording medium 4 and produces the digital data P using the control word P already produced by the decryption unit 6. Algorithms suitable for this processing include DES(Data Encryption Standard), RSA(named after Ron Rivest, Adi Shamir, and Len Adleman). When data is copied from this recording medium 4 to another recording medium, only the digital data C is copied, without the control word C. When reproducing data from the copy destination medium, descrambling processing cannot be performed correctly and therefore the user cannot receive services (Digital data P cannot be reproduced correctly). In this way, the copy operation is virtually prevented.

However, when the copy permission status information is rewritten in the SCMS, that is, when the information is altered, the following problem arises. For example, once the copy permission status information on the copy source medium, even if "10", is rewritten to "00" either when it is copied to a copy destination medium or by a processor on a transmission line, data may be illegally copied thereafter.

In addition, the conventional method for scrambling digital data in which all copies are prevented, the user is not permitted to create even a personal backup copy against an accidental destruction of a recording medium. This is unreasonable because the merit of using digital data is impaired. What is important is that copy operation should not be limited but that the copyright holder of digital contents should be paid for the service the user receives. This means that a copy management method other than that described above is required.

In the prior art, a method is disclosed which solves this problem by charging the user for the reproduction of digital contents reproduction, calculating the total of the usage amount, and distributing the charge among copyright holders (Japanese Patent Laid-Open Publication No. Hei 10-269289).

However, the conventional method and device, which return the digital contents usage status to a charge manager, require communication between the reproduction device and the charge manager and therefore makes processing complex.

SUMMARY OF THE INVENTION

In view of the foregoing, it is an object of the present invention to provide a master digital data creation device and a digital data reproduction device capable of preventing illegal copies with no need for communication between a reproduction device and a charge manager.

To achieve the above object, there is provided a master digital data creation device comprising: an encryption block generating a first control word based on a specified allowable number of reproductions and applying a one-way function to the first control word the allowable number of reproductions to generate a second control word; a scrambler receiving the second control word for scrambling desired first digital data using the second control word to produce second digital data; and an output block outputting the second digital data and the first control word to an external device.

According to the present invention, digital data, as well as the control word including information on the allowable number of reproductions, may be recorded on the recording media. Therefore, when reproducing the digital data, the number times data may be reproduced may be limited to the allowable number of reproductions. This simplifies accounting management and, at the same time, allows accounting processing for digital data copyright holders to be completed by charging the user for a user-desired predetermined number of reproductions the first time digital data is recorded on the recording media, thus eliminating the need for communication with the accounting manager for each reproduction.

To achieve the above object, there is provided a digital data reproduction device comprising: an acceptor accepting recording media on which second digital data and a first control word $CW_k$ are recorded, the first control word being generated based on a specified allowable number of reproductions, the second digital data being generated by scrambling desired first digital data using a second control word $CW_0$ generated by applying a one-way function to the first control word $CW_k$ K times; a decryption block receiving the first control word $CW_k$ and applying the one-way function to the first control word $CW_k$ k times to produce the second control work $CW_0$; a de-scrambler receiving the second digital data and the second control word $CW_0$ and de-scrambling the second digital data using the second control word $CW_0$ to produce the first digital data; and a reproduction unit reproducing the first digital data generated by the de-scrambler, wherein, after the reproduction by the reproduction unit, the decryption block writes a third control word $CW_{(k-1)}$ back to the recording media, the third control word being generated by applying the one-way function to the first control word $CW_k$ once, and wherein, if the first control word $CW_k$ received from the recording media equals the second control word $CW_0$, the de-scrambling by the de-scrambler and the reproduction by the reproduction unit are inhibited.

According to the present invention, when reproducing data from the recording media on which digital data and the control word including information on the allowable number of reproductions are recorded, the allowable number of reproductions may be decremented for each reproduction. Therefore, by inhibiting reproduction when the allowable number of times has reached 0, the number of times data may be reproduced may be limited to the allowable number of reproduction that is initially set.

In a preferred embodiment of the present invention, when a desired number of reproductions, n, is received from some other reproduction device, the decryption block receives the first control word $CW_k$ from the recording media and, if $k \geq n$, applies the one-way function to the first control word $CW_k$ (k-n) times to produce the third control word $CW_n$ and applies the one-way function to the first control word $CW_k$ n times to produce the fourth control word $CW_{(k-n)}$; if k<n, produces the first control word $CW_k$ as the third control word $CW_n$ and produces the second control word $CW_0$ as the fourth control word $CW_{(k-n)}$; and records the fourth control word $CW_{(k-n)}$ on the recording media for updating, further comprising: an output block outputting the second digital data recorded on the recording media, and the third control word $CW_n$ obtained from the decryption block, to the other reproduction device.

In this embodiment, when the number of reproductions, n, is specified by some other reproduction device, the third control word $CW_n$, as well as the second digital data, is output to the other reproduction device and, at the same time, the first control word $CW_k$ is updated to $CW_{(k-n)}$. Therefore, a part of the limited number of reproductions, k, is distributed from a reproduction device as a copy source to another reproduction device as a copy destination, connected to the copy source, through the copy operation. This makes it possible for the number of reproductions to be managed independently when digital data is reproduced at the reproduction device as a copy source and at the other reproduction device as a copy destination connected to the copy source.

Therefore, the present invention allows digital data to be distributed without impairing the merits of digital processing such as high-speed, non-degraded recording and reliable reproduction and, at the same time, prevents illegal copy.

The nature, principle and utility of the invention will become more apparent from the following detailed description when read in conjunction with the accompanying drawings.

BRIEF DESCRIPTION OF THE DRAWINGS

In the accompanying drawings:

FIGS. 2A and 2B are a block diagram showing a digital data reproduction device in an embodiment according to the present invention and a configuration diagram of main components, respectively.

FIG. 3 is a block diagram showing a master digital data creation device in the embodiment according to the present invention.

DESCRIPTION OF THE PREFERRED EMBODIMENTS

Figure 1:
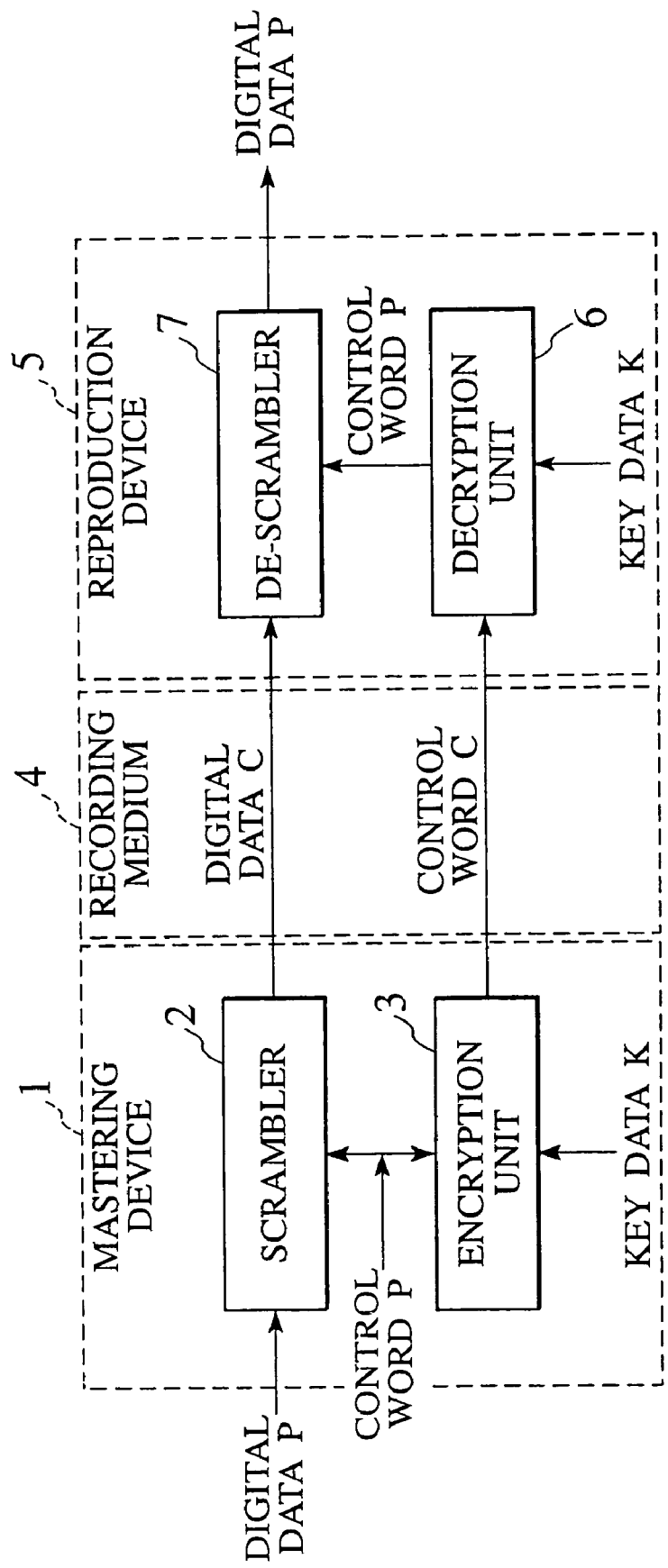
FIG. 1 is an overview of an example of a conventional copy prevention method.

An embodiment according to the present invention will be described below with reference to the accompanying drawings.

FIG. 2A is a block diagram of an embodiment of a digital data reproduction device according to the present invention, and FIG. 2B is a diagram showing the configuration of the decryption block shown in FIG. 2A. Before describing the digital data reproduction device in this embodiment, the following describes how digital data that is the source of all copies (that is, master digital data) is created in an illegal-copy prevention system according to the present invention.

FIG. 3 is a block diagram of an embodiment of a master digital data creation device according to the present invention. In the description below, master digital data is simply referred to as a master. Referring to FIG. 3, a master creation device 20 comprises a scrambler 21 scrambling digital data that is supplied to the user, an encryption block 22 encrypting a control word, and a communication block 23 communicating with user's reproduction device. The communication block 23 is connectable to a reproduction device 25 via a transmission medium 24.

Next, referring to FIG. 3, the master creation operation will be described. The master creation device 20 is installed, for example, in a store where video software and other software products are sold to the user. The user goes to the store and connects his or her own reproduction device 25 to the master creation device 20 via the transmission medium 24. The user specifies digital data corresponding to a desired service and the number of reproductions p. Although not shown in this figure, the user is charged for the number of reproductions p. Note that the charge also depends on the digital data type, contents and so on.

The number of reproductions p is sent to the encryption block 22 via the transmission medium 24 and the communication block 23 in the master creation device 20. Although not required as input to the encryption block 22, key data K is also input to the encryption block 22 to fully protect copyrights.

When the key data K is input to the encryption block 22, it is required that the same key data K be set also in the reproduction device 25. The key data K may be used as input to a one-way function within the encryption block 22. The encryption block 22 outputs control word $CW_p$ that depends on the number of reproductions p and control word $CW_0$ that is input to the scrambler 21. The control word $CW_p$ is sent to the reproduction device 25 via the communication block 23 and the transmission medium 24.

The scrambler 21 uses the control word $CW_0$ to scramble digital data P selected according to the user's desire. Encryption algorithms such as the DES maybe used for scrambling. Digital data C, which is output from the scrambler 21 as a master, is sent to the reproduction device 25 via the communication block 23 and the transmission medium 24. The digital data C and the control word $CW_p$ are recorded on the recording medium in the reproduction device 25. In this way, the user desired digital data P that is scrambled, as well as the control word $CW_p$, is created in user's reproduction device 25 to produce a recording medium that may be reproduced the number of reproductions p.

Figure 4A:
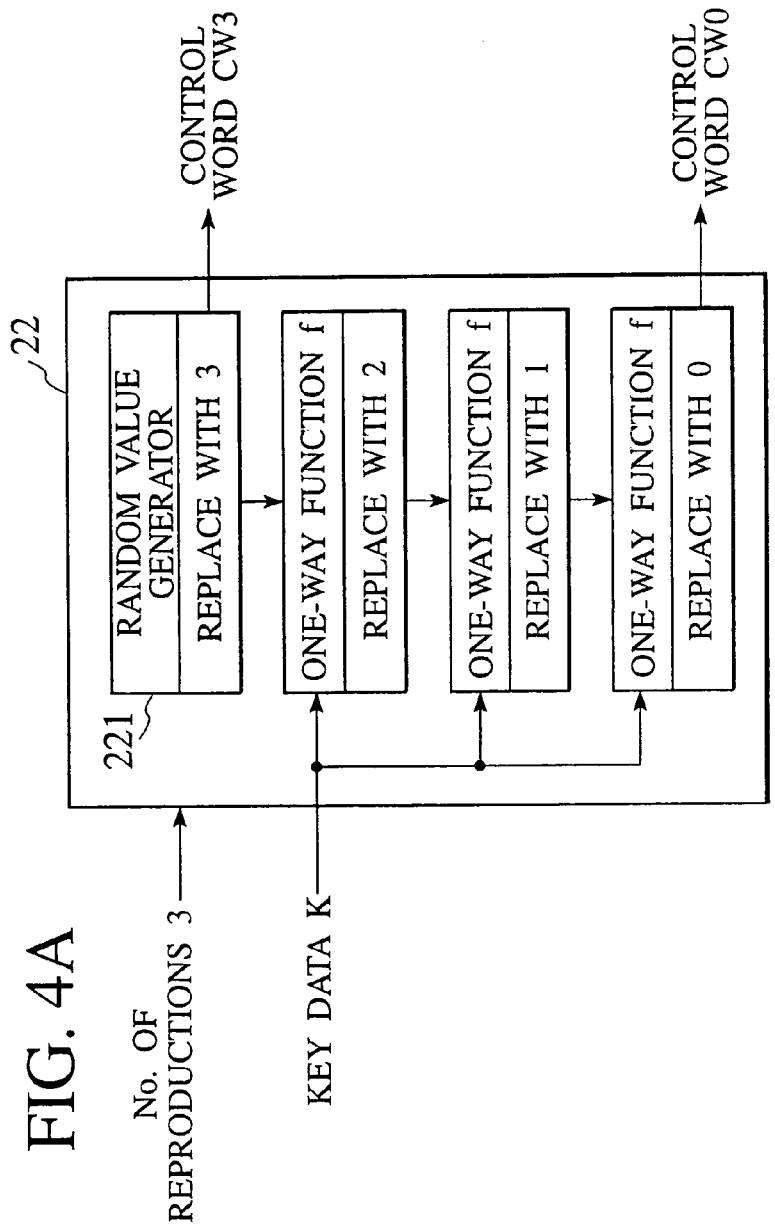
FIGS. 4A and 4B are a diagram depicting an example of the encryption block shown in FIG. 3 and the format of a control word, respectively.

FIG. 4A is an outline block diagram of an example of the encryption block 22 described above. This encryption block 22 first generates a random value from a random value generator 221 to perform replacement. Because the number of reproductions is 3 in the example in FIG. 4A, a part of the random value is replaced with 3 according to the format of the control word CW shown in FIG. 4B. The result is output as the control word $CW_3$.

Figure 4B:
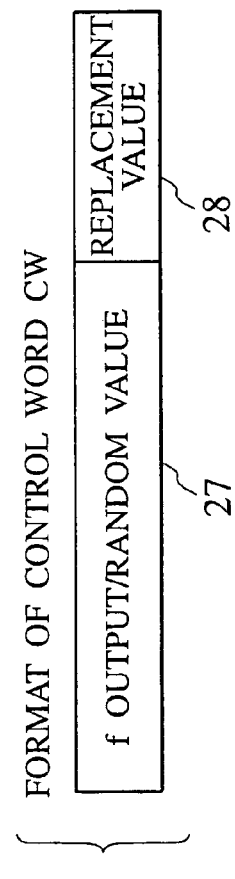

As shown in the format example in FIG. 4B, the control word CW is composed of a random value 27 of a one-way function f and a replacement value 28. The replacement value 28 indicates the number times the one-way function f is to be applied until the control word $CW_0$ is obtained. This is the number of times the one-way function is to be applied until the control word $CW_0$ is obtained which is used to indicate that the allowable number of reproductions has been exhausted in the master digital data reproduction device or that a control word necessary for digital data de-scrambling has been obtained.

The control word CW3 described above is processed recursively by the one-way function f the number of reproductions. The one-way function f is defined as a function whose input is difficult to estimate from the output. The key data K, as well as the control word CW, is input to the one-way function f as necessary. The replacement operation is also performed for the output of the one-way function f in each stage and, when the part of the control word CW eventually becomes 0, the control word is output as $CW_0$. This control word $CW_0$ is used by the scrambler 21.

Next, returning to FIGS. 2A and 2B, an embodiment of the digital data reproduction device will be described. As shown in FIG. 2A, a reproduction device 10 is connected to another reproduction device 17 via a transmission medium 16. This reproduction device 10 corresponds to the reproduction device 25 shown in FIG. 3. The reproduction device 10 comprises recording media 11a and 11b, a decryption block 12, a de-scrambler 13, a reproduction unit 14, and a communication block 15. On the recording medium 11a, the data C sent from the master creation device 20 described above and generated by scrambling the user desired digital data P is recorded. On the recording medium 11b, the control word $CW_p$ corresponding to the number of reproductions P is recorded.

The de-scrambler 13 uses the control word $CW_0$, sent from the decryption block 12, to de-scramble digital data from the recording medium 11a to produce digital data P. The reproduction unit 14 reproduces the received digital data P. The communication block 15 is provided for communication between the reproduction device 10 and the other reproduction device 17 via the transmission medium 16.

As shown in the block diagram in FIG. 2B, the decryption block 12 comprises a $CW_K$ register 121 in which the control word $CW_K$ read from the recording medium 11b is temporarily stored, a $CW_n$ register 122 in which the control word to be output to the communication block 15 is temporarily stored, a $CW_0$ register 123 in which the control word $CW_0$ to be output to the de-scrambler 13 is temporarily stored, and a one-way function f replacement processor 124. The one-way function f replacement processor 124 receives the number of reproductions n from the reproduction device 17.

Next, the operation of the embodiment shown in FIGS. 2A and 2B will be described. The digital data C, such as audio service data scrambled by the master creation device 20 with the use of the control word $CW_0$, is input to the reproduction device 10 for recording on the recording medium 11a. At the same time, the control word $CW_p$ corresponding to the number of reproductions p is input to the reproduction device 10 for recording on the recording medium 11b.

The control word $CW_p$ recorded on the recording medium 11b is read into the decryption block 12, where the control word $CW_p$ is decrypted to the control word $CW_0$ using the same keyword K as that used by the master creation device 20. The control word $CW_0$, in conjunction with the digital data C read from the recording medium 11a, is input to the de-scrambler 13. The de-scrambler 13 de-scrambles the received digital data C using the decryption control word $CW_0$ and outputs the de-scrambled digital data P to the reproduction unit 14.

The reproduction unit 14 decodes the encoded digital data P received from the de-scrambler 13 and outputs the decoded data to a device external to the reproduction device 10 for providing the service to users. After confirming that reproduction has been terminated, the decryption block 12 writes the control word $CW_{(p-1)}$ back to the recording medium 11b.

Next, copying the digital data C from the recording medium 11a to a recording medium on another reproduction device 17 will be described. In this case, the other reproduction device 17 first informs the reproduction device 10 of the desired number of reproductions, n, via the communication block 15. Assume that the control word currently recorded on the recording medium 11b is $CW_K$. The decryption block 12 reads this control word $CW_K$ from the recording medium 11b and recursively performs the one-way function and replacement for this control word to output the control word $CW_n$.

The control word $CW_n$ output from the decryption block 12, in conjunction with the digital data C read from the recording medium 11a, is supplied, via the communication block 15 and the transmission medium 16, to the other reproduction device 17 for copying the data to its recording medium. After confirming that a copy is created successfully, the decryption block 12 updates the contents of the recording medium 11b with the control word $CW_{k'}$ generated by recursively performing the one-way function and replacement for the control word $CW_k$. Note that k'=k−n. That is, because a copy permitting n times of reproductions is made from the recording media 11a and 11b, from which data may be copied up to k times, to the other reproduction device 17, the remaining number of reproductions of the recording media 11a and 11b equals (k−n) times.

Next, processing performed by the decryption block 12 will be described more in detail. Assume that the control word recorded on the recording medium 11b is $CW_5$ (K=5). That is, in the description below, it is assumed that digital data that may be reproduced up to five times will be copied once. In this case, the decryption block 12 reads the control word $CW_5$ from the recording medium 11b and temporarily stores it in the $CW_K$ register 121 in the decryption block 12.

Next, the processor 124 performs the one-way function f and replacement for the control word CW5 in the $CW_K$ register 121 once and stores the result in the $CW_K$ register 121 to update its contents. The one-way function f and replacement processing are the same as those performed by the encryption block 22 shown in FIG. 4A. That is, the $CW_K$ register 121 contains $CW_4$ at this time.

After that, the processor 124 performs the one-way function f and replacement repeatedly and, when the result becomes $CW_0$, stores this control word $CW_0$ in the $CW_0$ register 123. Finally, the contents of the $CW_K$ register 121 are written back to the recording medium 11b, and the contents of the $CW_0$ register 123 are output to the descrambler 13.

Next, the following describes how digital data is copied when the control word recorded on the recording medium 11b is $CW_5$ (k=5), that is, when data may be reproduced up to five times, and the number of reproductions of 2 is specified (n=2). In this case, the decryption block 12 reads the control word $CW_5$ from the recording medium 11b and temporarily stores it in the $CW_K$ register 121 in the decryption block 12.

Then, the processor 124 performs the one-way function f and replacement for the control word $CW_5$, stored in the $CW_K$ register 121, (k−n) times to produce the control word $CW_n$ and stores it in the $CW_n$ register 122. When n=2, the control word $CW_2$ is stored in the $CW_n$ register 122.

In addition, the processor 124 performs the one-way function f and replacement for the control word $CW_5$, stored in the $CW_K$ register 121, n times to produce the control word $CW_{(k-n)}$ and stores it in the $CW_k$ register 121 to update its contents. When n=2, the control word $CW_3$ is stored in the $CW_K$ register 121. That is, the remaining allowable number of reproductions is 3 (=5−2).

After that, the processor 124 performs the one-way function f and replacement repeatedly and, when the result becomes $CW_0$, stores this control word $CW_0$ in the $CW_0$ register 123. Finally, the control word $CW_2$ stored in the $CW_n$ register 122 is output to the communication block 15 and then the contents ($CW_3$) of the $CW_K$ register 121 are written back to the recording medium 11b.

Next, the following describes how digital data is copied when the control word recorded on the recording medium 11b is $CW_5$ (k=5), that is, when data may be reproduced up to five times, and the number of reproductions of 6 is specified (n=6). In this case, too, the decryption block 12 reads the control word $CW_5$ from the recording medium 11b and temporarily stores it in the $CW_K$ register 121 in the decryption block 12.

In this case, because k−n=5−6=−1(≦0), the processor 124 does not perform processing for the control word $CW_5$, with the control word $CW_5$ remained in the $CW_n$ register 122.

In addition, because k−n=5−6=−1(≦0), the processor 124 performs the one-way function f and replacement for the control word $CW_5$, stored in the $CW_K$ register 121, maximum times, namely, five times to produce the control word $CW_0$ and stores it in the $CW_K$ register 121 to updates its contents. That is, the remaining allowable number of reproductions becomes 0. The control word $CW_0$ is stored in the $CW_0$ register 123.

Finally, the control word $CW_5$ stored in the $CW_n$ register 122 is output to the communication block 15 and then the contents ($CW_0$) of the $CW_K$ register 121 are written back to the recording medium 11b. After that, when the recording media 11a and 11b are reproduced, the control word $CW_0$ is reproduced from the recording medium 11b and therefore the decryption block 12 does not decode data and reproduction is not performed normally. As described above, even if the number of reproductions larger than the allowable number of reproductions is specified in this embodiment, only the allowable number of reproductions may be made and an attempt to create more copies than the allowable number of reproductions is prevented.

It should be understood that many modifications and adaptations of the invention will become apparent to those skilled in the art and it is intended to encompass such obvious modifications and changes in the scope of the claims appended hereto.

What is claimed is:

1. A master digital data creation device for supplying second digital data obtained by scrambling first digital data to a digital data reproduction device having a recording medium, comprising:

an encryption block generating a first control word for identifying an allowable number of reproductions specified by the digital data reproduction device and applying a one-way function to the first control word a number of times corresponding to the allowable number of reproductions to generate a second control word for scrambling the first digital data and representing a number of times said first digital data has been reproduced;

a scrambler receiving the second control word and using the second control word to produce the second digital data; and an output block outputting the second digital data and the first control word to the digital data reproduction device.

2. A digital data reproduction device comprising:

an acceptor accepting recording media on which first digital data and a first control word are recorded, said first control word being generated based on a specified allowable number k of reproductions and being an identifier of said allowable number k of reproductions, said first digital data having been generated by scrambling desired second digital data using a second control word having been generated by applying a one-way function to the first control word k times;

a decryption block receiving the first control word and applying the one-way function to the first control word k times to produce the second control word;

a de-scrambler receiving the first digital data and the second control word and de-scrambling the first digital data using the second control word to produce the second digital data; and a reproduction unit reproducing the second digital data generated by said de-scrambler, wherein, after every reproduction by said reproduction unit, said decryption block writes a third control word back to said recording media representing a remaining number of allowable reproductions of said second digital data, said third control word being generated by applying the one-way function to the first control word once, and wherein, if the first control word received from the recording media equals the second control word, the de-scrambling by said de-scrambler and the reproduction by said reproduction unit are inhibited.

3. The digital data reproduction device according to claim 2, wherein, when a desired number of reproductions, n, is received from some other reproduction device, said decryption block receives the first control word from the recording media and, if $k \geq n$, applies the one-way function to the first control word (k−n) times to produce the third control word representing a remaining number of allowable reproductions of said second digital data and applies the one-way function to the first control word n times to produce the fourth control word representing a replacement identifier for said first control world for representing an allowable number of reproductions of said second digital data; and records the fourth control word on the recording media for updating, further comprising:

an output block outputting the first digital data recorded on the recording media, and the third control word, obtained from the decryption block, to the other reproduction device.

* * * * *